United States Patent [19]
Domnitch

[11] 3,772,855
[45] Nov. 20, 1973

[54] INCINERATOR EMISSIONS REDUCTION SYSTEM

[76] Inventor: Irving Domnitch, 80-15 41st Ave., Elmhurst, N.Y. 11373

[22] Filed: Feb. 14, 1973

[21] Appl. No.: 332,340

Related U.S. Application Data

[63] Continuation-in-part of Ser. No. 65,906, Aug. 21, 1970, Pat. No. 3,710,555.

[52] U.S. Cl. .................. 55/227, 55/228, 55/233, 55/242, 55/260, 110/119, 261/17, 261/100, 261/DIG. 9
[51] Int. Cl. ............................................ B01d 47/06
[58] Field of Search.................. 55/233, 227, 228, 55/242, 260; 110/119; 261/17, 100, DIG. 9

[56] References Cited
UNITED STATES PATENTS

| | | | |
|---|---|---|---|
| 2,802,543 | 8/1957 | Clark | 55/227 |
| 3,458,178 | 7/1969 | Warnick | 261/17 |
| 3,695,004 | 10/1972 | DeLisio et al. | 55/227 |
| 3,710,555 | 1/1973 | Domnitch | 55/233 |
| 3,728,976 | 4/1973 | Domnitch | 110/119 |

*Primary Examiner*—Bernard Nozick
*Attorney*—Ostrolenk, Faber, Gerb & Soffen

[57] ABSTRACT

A module for use in a system which upgrades the quality of pollution control within incinerators in which particulate emission is significantly reduced through automatic wet scrubbing of the smoke to remove particulate and other harmful material before emission of the smoke into the air. The system operates automatically in the presence of smoke and is self-cleaning. The module is positioned within an expansion chamber and comprises a porous barrier, spray heads, and a collection chamber for soaking, collecting and removing particulate.

6 Claims, 4 Drawing Figures

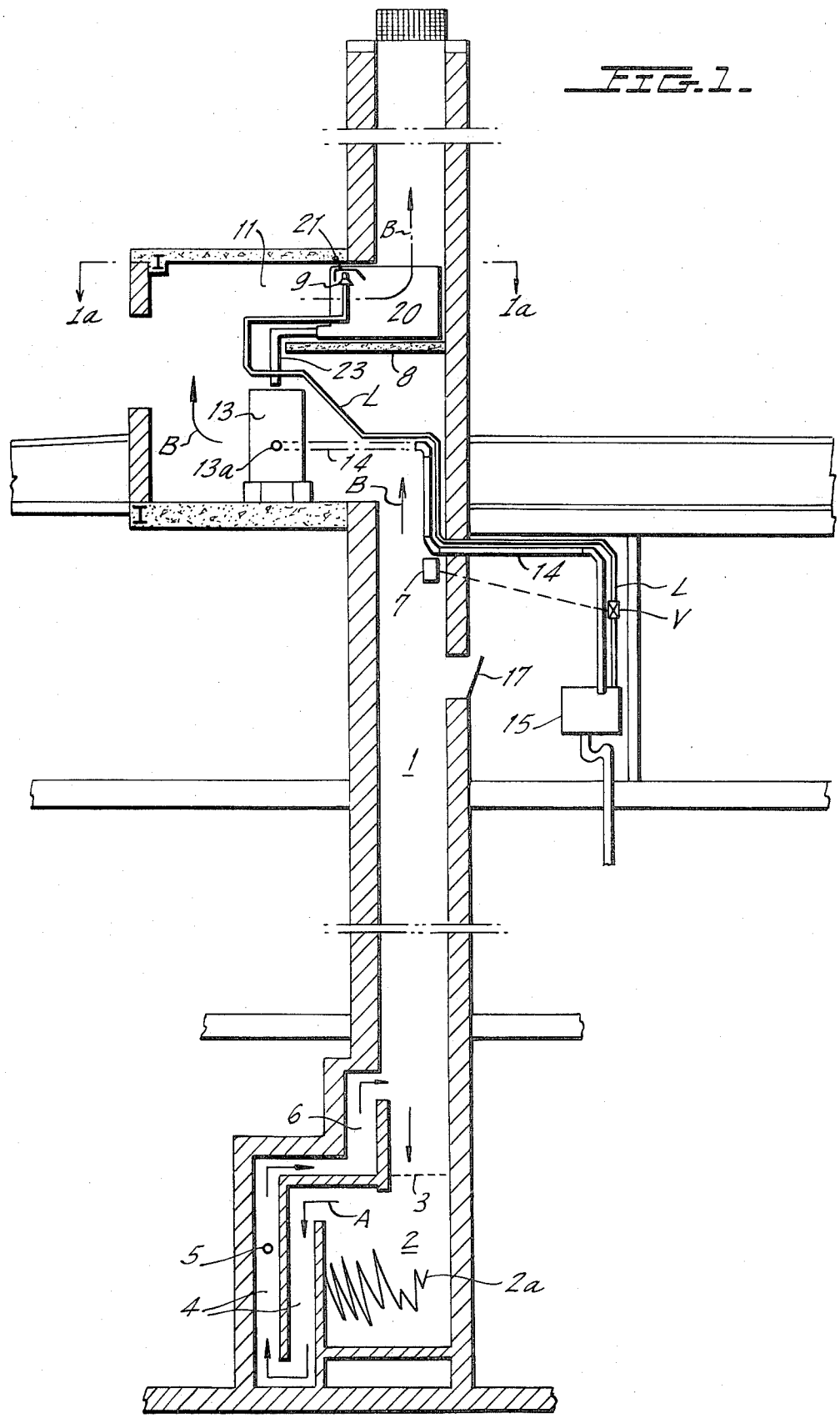

INCINERATOR EMISSIONS REDUCTION SYSTEM

This application is a continuation-in-part of application Ser. No. 65,906, filed 21 Aug. 1970, now U.S. Pat. No. 3,710,555 issued Jan. 16, 1973.

The present invention relates to incinerators and more particularly to a novel scrubber for use in incinerator systems which operates under control of automatic means and is substantially self-cleaning.

The primary concern of the present invention is the reduction of pollution in the air we breathe as a result of inefficient incinerators.

The invention provides a method and apparatus for scrubbing incinerator gases in an economical manner and having few moving parts so as to provide a high quality and yet simple and reliable structure.

Conventional reduction and emission control systems incorporate a multitude of controls and components to achieve a completely automated burning cycle. The nature of such present day structures is so complicated that any breakdown, in so much as any minor component contained therein, requires a complex and tedious procedure before the system can be put back "on line," thereby significantly increasing the cost of design, assembly, maintenance, and operation.

The present invention is characterized by providing a system which effectively reduces particulate and other undesirable material from incinerator emissions, while doing so in a simple straightforward and highly reliable manner.

The present invention is comprised of barrier means within the exiting flue for constraining the emitted particulate bearing emission to flow in a tortuous path. Automatic smoke detector means are provided in the neighborhood of the barrier for selectively energizing a water spraying device to emit a fine water spray upon a porous barrier, only in the presence of an emission, The emission, in passing through the porous barrier, is thoroughly washed, causing particulate to be removed therefrom through the combined cooperation of the porous material and the film of water sprayed upon one surface of the barrier. Particulate so removed from the emission is carried together with the water into a collection device where it may be simply and easily removed. The water spray serves the further function of continuously washing the porous barrier so as to provide a substantially self-cleaning system.

The porous barrier spans one opening of a housing positioned within and entirely filling the passageway in an expansion chamber. Spray heads continuously wash the barrier to wet down particulate causing the particulate to collect within the housing and be skimmed into a refuse drum or other container. The module is self-cleaning to reduce maintenance to a minimum, typically one cleaning per year, or less.

It is therefore one object of the present invention to provide a novel emission reducing structure for use in incinerators and the like, in which a porous barrier and film of water associated therewith, are utilized to remove particulate from an incinerator emission and performing the dual function of self-cleaning of the system.

This as well as other objects of the present invention will become apparent when reading the accompanying description and drawings in which:

FIG. 1 shows an incinerator system incorporating the principles of the present invention, and is a view looking in the direction of arrows 1—1 of FIG. 1a.

FIG. 1a is a plan view of FIG. 1 looking in the direction of arrows 1a—1a.

Figure 1A:
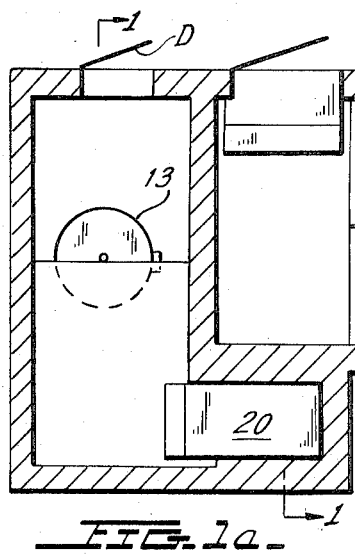
Figure 2:
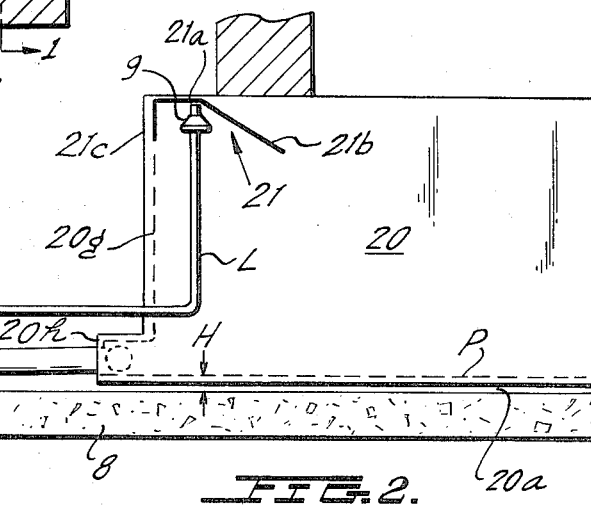
FIG. 2 shows an elevational view of the settling chamber-spray box of FIG. 1.
Figure 3:
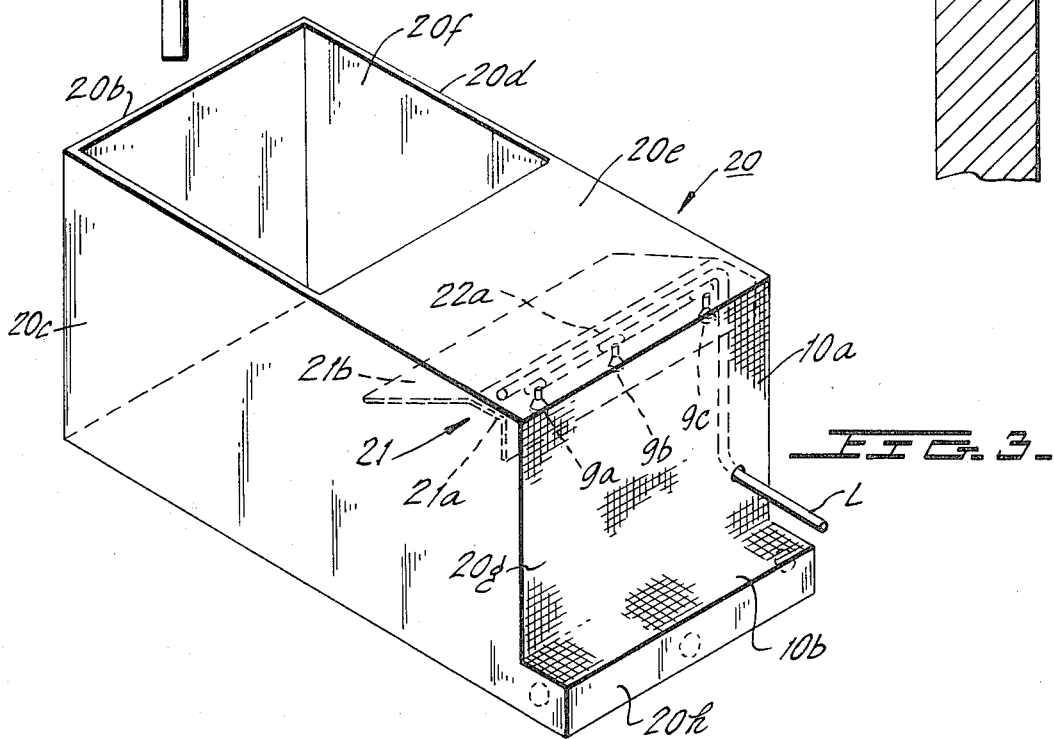
FIG. 3 is a perspective view of the chamber of FIG. 2.

The incinerator system 10, as shown in FIG. 1, may, for example, be installed within a multifloor building such as an apartment house. The drawing shows a schematic flow diagram of the progress of emissions from a primary combustion chamber provided in the lowest level thereof to the point where the emission enters into the atmosphere.

Occupants of the building may drop their waste and garbage into a chute-flue 1, through suitable hingedly mounted doors 17, which are preferably biased (by means not shown) to remain in a normally closed position.

The refuse drops downwardly, by gravity, into a primary combustion chamber 2, where the flames or heat source 2a burns the refuse.

During combustion, the charging flue gate 3 is moved to the closed position. The combustion gases follow the path indicated by arrow A into a tortuous shaped secondary chamber 4. The combustion gases pass a gas fired after burner 5, located within a portion of the tortuous shaped chamber, to burn and thereby reduce the fly ash content within the combustion emission. The combustion gases continue substantially in the upward vertical direction where they pass through a by-pass chamber section 6 and enter into the main flue 1.

The combustion gases continue to move vertically upward until they reach a baffle 8 which constrains the gases to move along a tortuous path as indicated by the arrows B. An automatic smoke detector device 7 is located beneath the underside of baffle 8 so as to be directly in the path of movement of the combustion gases. The smoke detector 7 is coupled to a valve V in water supply line L which supplies the spray heads 9 (to be more fully described). The water spray device has a spray head 9 whose valve V is operated under control of the smoke detector device 7 so as to permit the passage of water through the valve mechanism and thereby emit a water spray upon one surface of a barrier member 10. The porous barrier member 10 may preferably be a screen positioned within expansion chamber 11 so as to cause any emissions directed toward the porous barrier to be constrained to pass therethrough. The water spray device 9, when actuated by the automatic smoke detector device 7, in the presence of an incinerator emission, provides a film of water which covers one surface of the porous barrier 10, whereby the porous barrier and water film jointly cooperate to wash particulate from the emission. If desired, the smoke detector may be substituted by a temperature sensing device which operates valve V to supply water to the spray head assembly when a predetermined temperature level is present in flue 1.

The porous barrier is mounted to span one opening of a housing 20 comprised of a base 20a, rear wall 20b, side walls 20c and 20d, and top wall 20e. An outlet opening 20f is defined by the top edges of walls 20b, 20c and 20d and the left-hand edge of top wall 20e. An inlet opening 20g is defined by the right-hand edges of side walls 20c and 20d and top wall 2oe, and the top edge of short front wall 20h.

Screen 10, which may, for example, be an open mesh screen of 20 gauge stainless steel, spans the aforesaid inlet opening and has a portion 10a thereof vertically aligned and the remaining portion 10b aligned horizontally.

The housing 20 is positioned within expansion chamber 11 whose perimeter, measured in the horizontal plane, is greater than the perimeter of flue 1 to cause the velocity of upwardly moving smoke and particulate to be abruptly decreased due to the change in volume and cross-section of the passageway.

The housing 20 has its base 20a resting upon a baffle 8 which serves to guide smoke and particulate to move along a tortuous path defined by arrows B as the waste matter moves upward.

The housing 20 is provided with a baffle plate 21 having a first portion 21a secured to the interior of top wall 20e, a second portion 21b extending diagonally downward, and a third portion 21c extending vertically downward.

The water pipe L has a horizontal portion 22a secured to the underside of baffle plate portion 21a and is fitted with fan spray heads 9a, 9b and 9c which direct a fan-like spray of water toward the interior side of screen 10 so as to constantly "wash" the interior of screen 10.

Upwardly moving smoke and particulate is constrained to pass through screen 10 whereby the spray of water upon screen 10 causes particulate to be washed downwardly upon the exterior of screen 10 and upon and through screen portion 10b so as to be collected upon the base of housing 20 which is designed to be water-tight whereupon the water washed down together with particulate collects in the base of housing 20. The particulate floats upon the surface of the collected pool P of water and is carried away through drain pipe 23 as soon as the water reaches a height H. Substantially all of the particulate is caused to pass through pipe 23 due to the constant flow of water from spray heads 9a–9c thereby reducing maintenance of said housing to a minimum. It has been found that housing 20 requires cleaning less than once a year.

Particulate which may be too large to pass through screen 10 will be washed down to screen portion 10b. The constant flow of water tends to disintegrate the particulate whereupon it will pass through the horizontally aligned portion 10b of the screen.

The constant washing of screen 10 by spray heads 9a–9c serves to continually clean screen 10 so that the removal of particulate by screen 10 will not be impaired even after long continuous use.

Access to housing 20 is obtained through door D provided in one wall of the expansion chamber 11.

The baffle plate 21 serves to confine the water spray of spray heads 9a–9c to the immediate region of screen 10 (by plate portion 21b) and to prevent the horizontal portion of the spray from passing directly through screen 10 (due to plate portion 22c).

The drain pipe 23 leads to a refuse container 13. An overflow pipe 14 is positioned approximately half-way up the side of container 13.

Pipe 14 permits water reaching the intermediate level 13a to run off pipe 14 to be collected within a second container 15 provided at a lower floor.

The wetted down pollutants are caused to settle at the bottom of container 13 and may be periodically collected therefrom.

The housing 20 completely fills the flue portion 1a as shown best in FIG. 1a so as to constrain all pollutants to pass through housing 20.

The water film and screen jointly cooperate to remove the harmful components carried by the gaseous emission, while at the same time providing a unique arrangement for self-cleaning of the system.

Although there has been described a preferred embodiment of this novel invention, many variations and modifications will now be apparent to those skilled in the art. Therefore, this invention is to be limited, not by the specific disclosure herein, but only by the appending claims.

What is claimed is:

1. Apparatus for removal of particulate and other pollutants from an incinerator emission comprising:

a flue having an inlet and an outlet for carrying the combustion gases from its inlet, which gases are emitted from an incinerator, to the outlet thereof, whereby the emission may enter into the atmosphere;

an enlarged expansion chamber coupled between the inlet and outlet of said flue to permit the passage of gases therethrough at a reduced velocity;

a baffle being provided within said flue and extending from one wall of said enlarged chamber and aligned substantially transverse to the path of movement of exiting gases through said flue for causing exiting gases to move around said barrier plate in moving toward said outlet;

a housing positioned upon said baffle said housing having an inlet opening for receiving gases as they pass around said baffle and an outlet opening for enabling gases passing through said housing to pass out of said expansion chamber;

porous barrier means completely covering said inlet opening for constraining gaseous emissions to pass therethrough in moving toward the outlet of said flue;

means positioned within said housing for spraying the exit surface of said porous barrier means to provide a substantially constant film of water thereon, whereby said porous barrier and said film of water cooperate to wash particulate and other noxious elements from the gaseous emission before exiting from the outlet end of said flue;

the base of said housing being adapted to collect water emitted from said spray means to form a pool in said housing;

a drain tube coupled to one wall of said housing to drain off particulate collecting upon the surface of said pool as the water level reaches a predetermined height.

2. The apparatus of claim 1 wherein said porous barrier means is a mesh screen having an L-shaped configuration, one portion of said screen being vertically aligned and the remaining portion thereof being horizontally aligned and extending in a direction away from the interior of said housing;

said spray means being adapted to direct a water spray upon the interior sides of the vertically aligned portion of said screen;

said horizontally aligned portion being adapted to support any particulate which is too large to pass through said screen whereby water from said spray passing through the vertical portion of said screen falls upon said horizontal portion to wet particulate collected upon said horizontal portion and thereby cause said particulate to pass through said horizontal screen portion and deposited upon said pool of water.

3. The apparatus of claim 2 further comprising a deflector plate mounted within said housing and positioned above said spray means for deflecting the water spray so as to strike said screen whereby the path of the angle of intersection of the spray and the vertical section of the screen is less than 90°.

4. The apparatus of claim 1 further comprising detector means positioned beneath said baffle and near the inlet end of said enlarged chamber, for selectively operating said means for providing a water spray.

5. The apparatus of claim 4 wherein said detector means is a smoke detector.

6. The apparatus of claim 4 wherein said detector means is a temperature sensitive means for activating said spray means only when the temperature in the region of said detector reaches a predetermined level.

* * * * *